US008819053B1

(12) United States Patent
Funaro

(10) Patent No.: US 8,819,053 B1
(45) Date of Patent: Aug. 26, 2014

(54) INITIATING TRAVEL SEARCHES

(75) Inventor: Jesse Funaro, Somerville, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/465,776

(22) Filed: May 7, 2012

(51) Int. Cl.
*G06F 7/00* (2006.01)

(52) U.S. Cl.
USPC .......... 707/767

(58) Field of Classification Search
USPC .......... 707/767
See application file for complete search history.

(56) References Cited

U.S. PATENT DOCUMENTS

| | | | | |
|---|---|---|---|---|
| 8,204,683 | B2 * | 6/2012 | McQuaide, Jr. | 701/431 |
| 2002/0059220 | A1 * | 5/2002 | Little | 707/5 |
| 2006/0041538 | A1 * | 2/2006 | King et al. | 707/3 |
| 2010/0010978 | A1 * | 1/2010 | Carapella et al. | 707/4 |

* cited by examiner

*Primary Examiner* — Truong Vo
(74) *Attorney, Agent, or Firm* — Fish & Richardson P.C.

(57) ABSTRACT

Methods, systems, and apparatus, including computer programs encoded on a computer storage medium, for receiving an input including an item, receiving information associated with the item, where the information includes implicit information, determining explicit information based on the implicit information, where the explicit information identifies a geographic location associated with the item, providing a travel search interface including multiple search fields, where the multiple search fields include a destination field, and pre-populating the destination field with a travel destination location associated with the geographic location.

17 Claims, 5 Drawing Sheets

INITIATING TRAVEL SEARCHES

BACKGROUND

This specification relates to initiating travel searches. Internet-based travel websites provide digital mediums that allow users of the websites to explore a variety of travel options for planning trips. For example, using tools provided by travel websites, users can search flight schedules, price flight schedules, and, in some cases, purchase airline tickets. In some cases, users can further explore other travel-related options provided by travel websites, such as information related to lodging, activities available at destination locations, and other transportation modes. Conventional travel websites can be provided by a travel service provider. Alternatively, travel websites can be provided by third-party entities that provide travel-related information received from several travel service providers. Upon deciding to plan a trip and determining a destination location, a user can access a desired travel website, for example, by inputting a known uniform resource locator (URL) associated with the travel website in a browser or performing an internet search to locate the travel website.

SUMMARY

In some implementations of this specification, systems and methods are realized for initiating travel services. In particular, implementations of the present disclosure are directed to enabling an internet user to begin planning a trip upon being inspired to travel. While viewing internet websites, internet users often encounter items that are associated with a particular location. Implementations of the present disclosure can allow a user to initiate a travel search to a particular location upon viewing an item displayed on a web page that is associated with the particular location.

In general, one innovative aspect of the subject matter described in this specification can be implemented in methods that include the actions of receiving an input including an item; receiving information associated with the item, the information including implicit information; determining explicit information based on the implicit information, the explicit information identifying a geographic location associated with the item; providing a travel search interface including multiple search fields, the multiple search fields including a destination field; and pre-populating the destination field with a travel destination location associated with the geographic location. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The item is an image or a text string. The information further includes a geo tag. The explicit information includes one or more of a latitude, a longitude, a country, a city, an airport, an address, or a direct indicator of the geographic location. The implicit information includes one or more of an IP address, a set of one or more recognizable features of a locatable object associated with the item, or an indirect indicator of the geographic location. The operations further include receiving information associated with a user of the system, the information being received from one or more sources including a social networking account, an IP address, or the user of the system. Determining the explicit information based on the implicit information is performed using one or more tools including image recognition software, search-by-image software, or a character string search algorithm. The travel destination location includes one or more of a name of a city, a name of a country, or an airport code.

The subject matter described in this specification can be implemented in particular implementations so as to realize one or more of the following advantages. A user can begin planning a trip without having to manually navigate to a travel website. Thus, implementations of the present disclosure can reduce the time required to begin planning a trip. Implementations further provide a destination location associated with an inspiration to travel to a destination, such that the user can begin planning the trip without initially knowing the location associated with the inspiration.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example implementations of the present disclosure are directed to initiating travel services. In particular, implementations of the present disclosure are directed to enabling an internet user to begin planning a trip upon being inspired to travel and without having to manually navigate to a travel website. While viewing internet websites, internet users often encounter items, e.g., images and text, that are associated with a particular location. In some examples, viewing such an item evokes an interest in the user to travel to a particular location associated with the item. For example, the user may view a photo of a landmark, e.g., the Eiffel Tower located in Paris, France, that another internet user has posted on a social networking website in order to share content relating to a vacation experience. Upon viewing the photo, the user may develop an interest in traveling to the particular location, e.g., Paris, France. Implementations of the present disclosure can allow a user to initiate a travel search to a location upon viewing an item displayed on a web page that is associated with the location. Example web pages that may provide items inspiring a user to travel to a particular location include those directed to events, museums, photo sharing, social networking, or newspapers, but in general can include those directed to various purposes.

Figure 1:
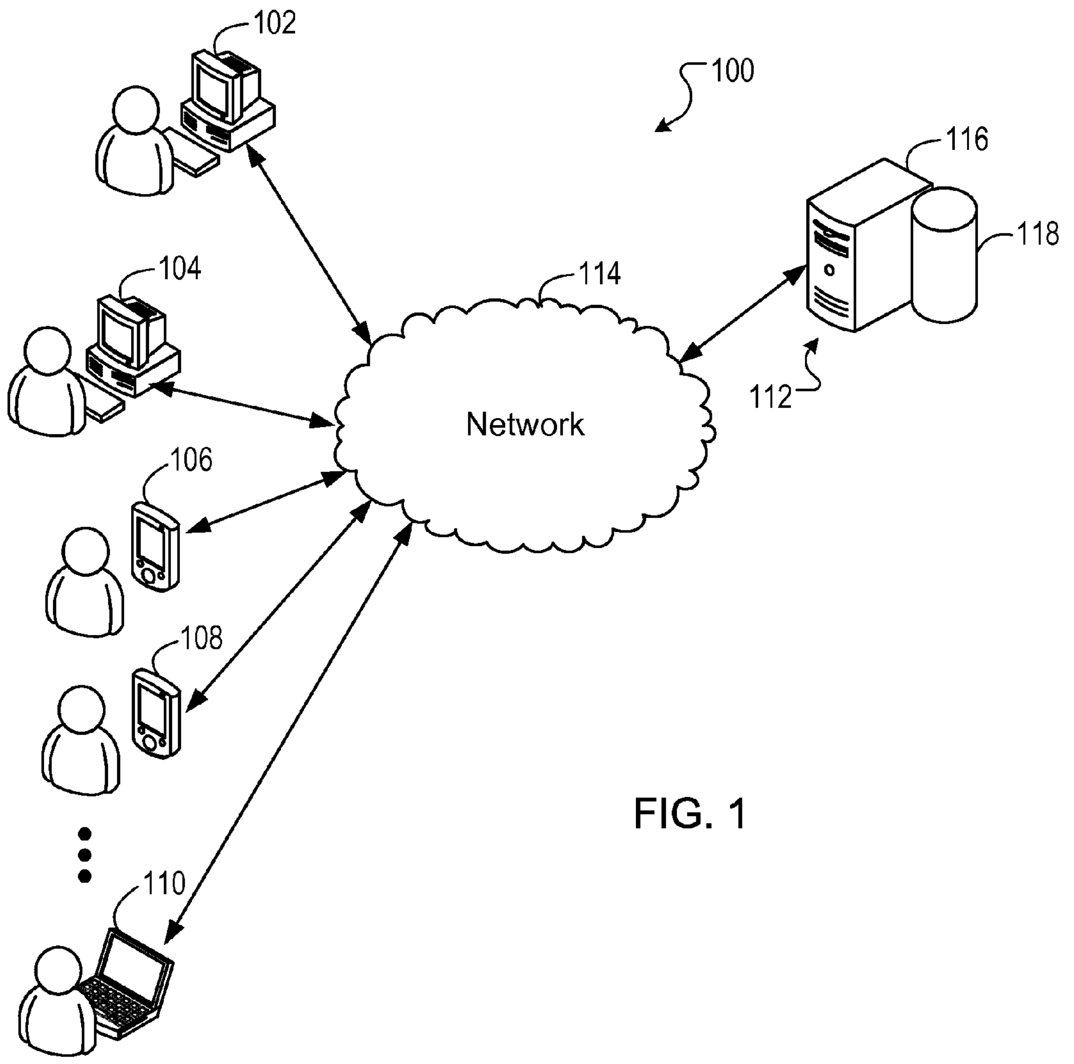
FIG. 1 is a diagram of an example network architecture that implements an example process for initiating a travel search.

FIG. 1 is a diagram of an example network architecture that implements an example process for initiating a travel search. The network architecture 100 includes a number of client devices 102-110 communicably connected to a server system 112 by a network 114. The server system 112 includes a processing device 116 and a data store 118. The processing device 116 executes computer instructions, e.g., instructions for initiating a travel search, stored in the data store 118 to perform the functions of a travel portal server.

In some implementations, the client devices 102-110 can be provided as computing devices such as laptop or desktop computers, smartphones, personal digital assistants, portable media players, tablet computers, or other appropriate computing devices that can be used to communicate with a travel portal server. In some implementations, the server system 112 can be a single computing device such as a computer server. In some implementations, the server system 112 can represent more than one computing device working together to perform the actions of a server computer, e.g., cloud computing. In some implementations, the network 114 can be a public communication network, e.g., the Internet, cellular data network, dialup modems over a telephone network, or a private communications network, e.g., private LAN, leased lines.

Users of the client devices 102-110 access the server device 112 to initiate travel searches. For example, the client devices 102-110 can execute web browser applications that can be used to launch travel portal websites and populate fields included within the travel portal websites. In another example, the client devices 102-110 can execute software applications that are specific to a travel portal website, e.g., travel applications running on smartphones. Users interacting with a client device 102-110 can initiate a travel search by selecting, e.g., clicking on, an item, e.g., an image or a text string, shown on a web page that is displayed within a browser of the client device 102-110.

Figure 2:
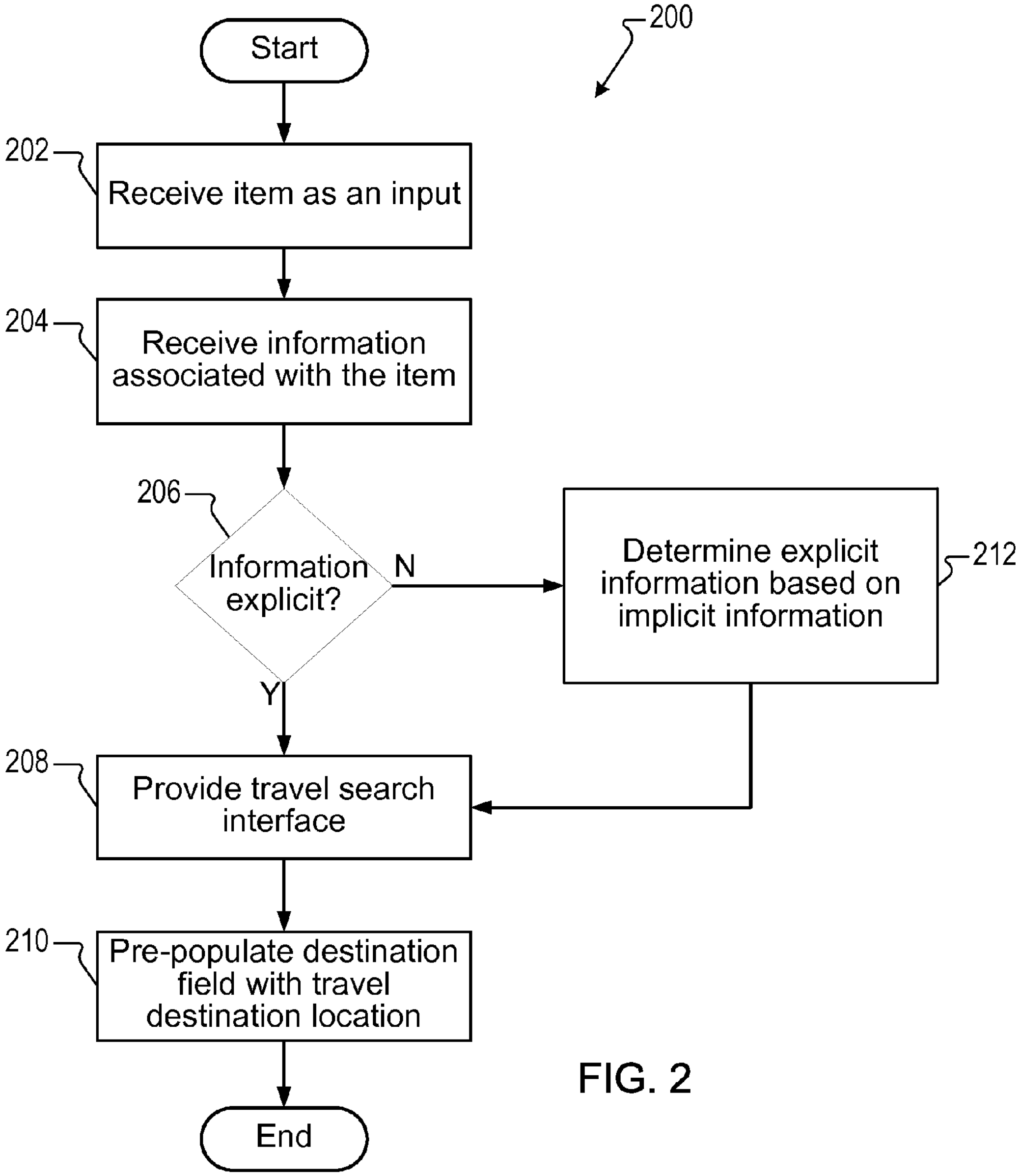
FIG. 2 is a flowchart of an example process for initiating a travel search.

FIG. 2 is a flowchart of an example process for initiating a travel search. In some implementations, the example process 200 can include operations that are performed using one or more computer programs executed using one or more data processing apparatus, e.g., one or more client devices 102-110 and/or one or more server systems 116. Upon a user encountering an item, e.g., an object displayed on a web page, such as an image or a text string, on a web page displayed in a browser on a client device, e.g., a browser at a client device 102-110 of FIG. 1, the user can be inspired to travel to a particular destination associated with the item. In some instances, the user may know the location associated with the item, while in other instances, the user may not know the location associated with the item. The user can select, e.g., click on, the item, and the item can subsequently be received as an input 202 by a travel portal system running on a server system, e.g., the server system 112 of FIG. 1.

Figure 3:
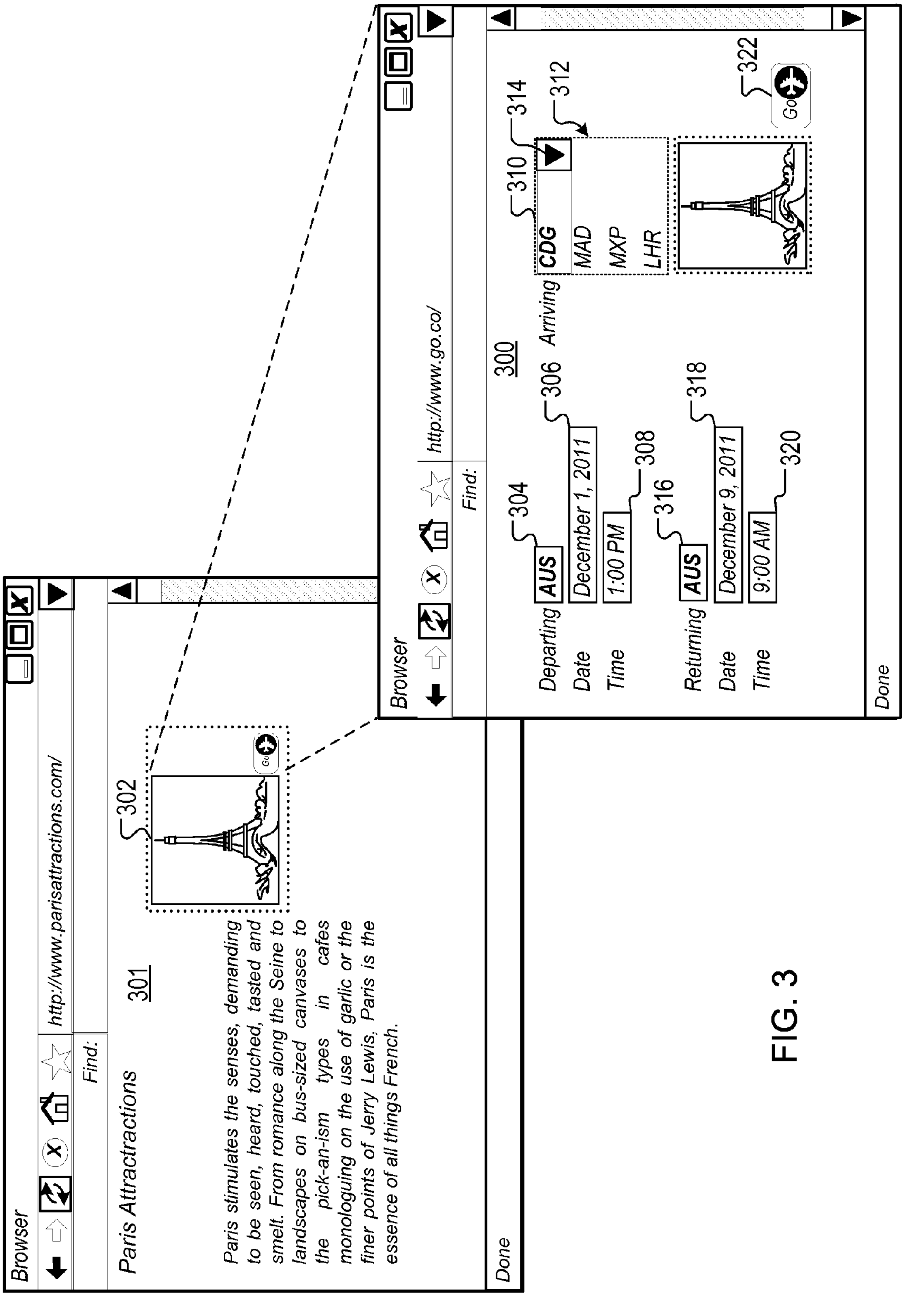
FIG. 3 depicts an example travel portal web page from which a travel search may be initiated.
Figure 4:
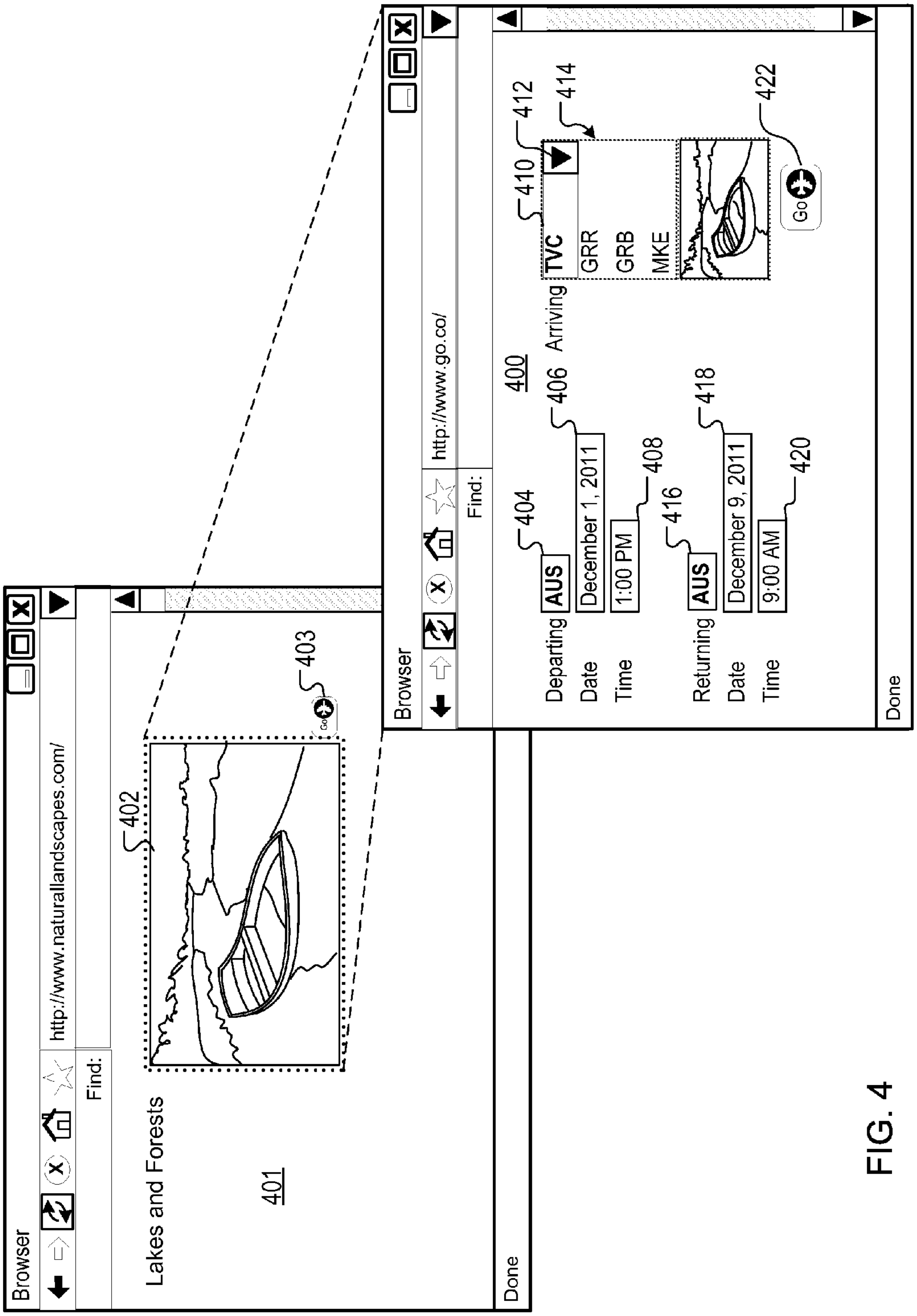
FIG. 4 depicts an example travel portal web page from which a travel search may be initiated.
Figure 5:
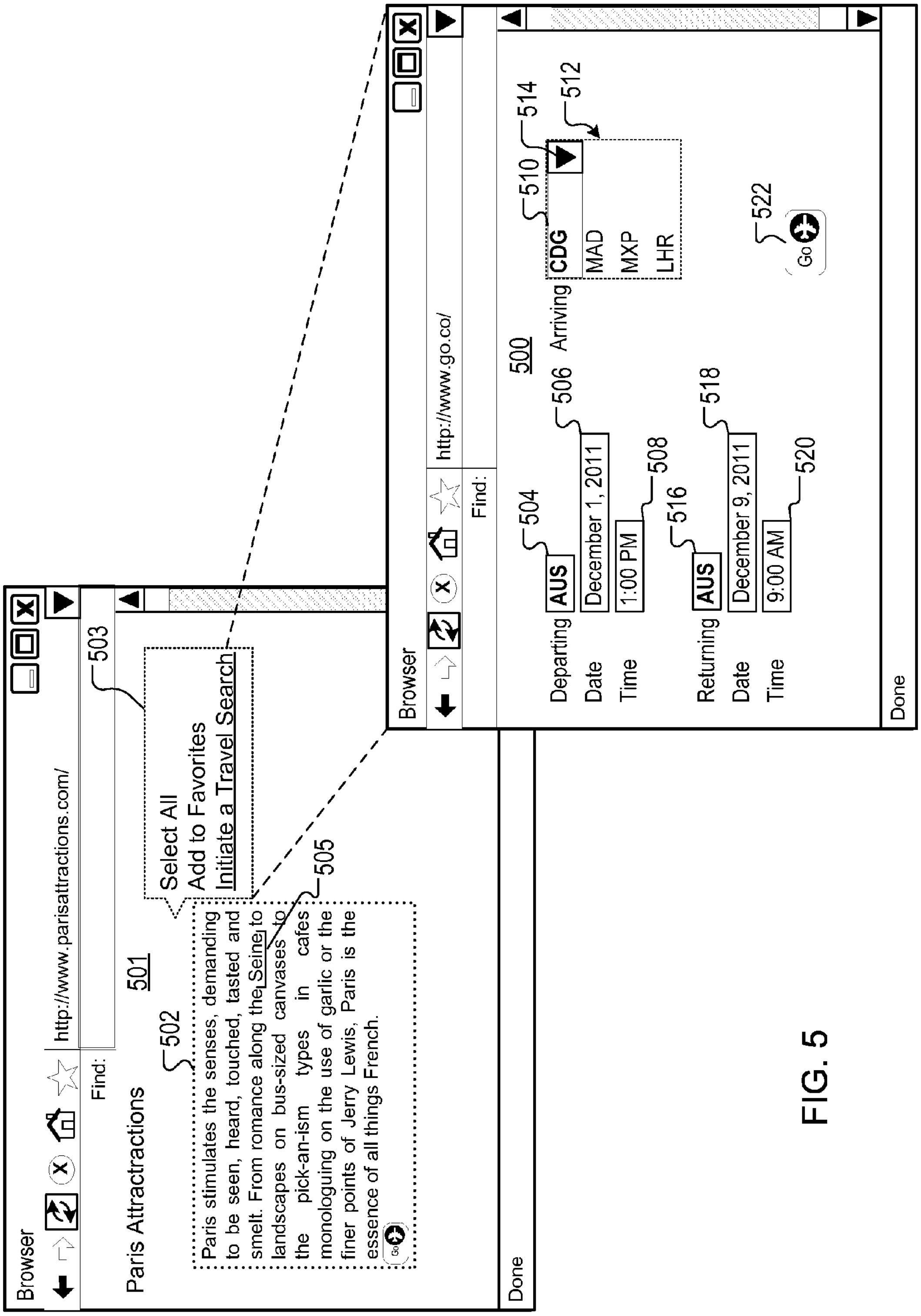
FIG. 5 depicts an example travel portal web page from which a travel search may be initiated.

In some examples, the destination may be a geographic location of an object depicted in an image and that is known to the user. For example, as shown in FIG. 3, an image 302 of the Eiffel Tower displayed on a web page 301 can inspire the user to travel to the location of the Eiffel Tower, e.g., Paris, France. In some examples, the destination may be a geographic location associated with an object displayed in an image and that is unknown to the user. For example, as shown in FIG. 4, an image 402 of a boat floating on a lake displayed on a web page 401 can inspire the user to travel to the location of the lake, which is initially unknown to the user. In some examples, the destination may be a geographic location associated with a text string. For example, as shown in FIG. 5, a text string 502 displayed on a web page 501 describing tourist attractions can inspire the user to travel to the location, e.g., Paris, France in the example of FIG. 5.

In some examples, the user can select, e.g., click directly on, the item, upon which a browser add-on can send the item as an input to the travel portal system. For instance, in the example of FIG. 3, the user can select the image 302, upon which the travel portal system can receive the image 302 as an input. In some examples, the user can alternatively select an icon provided by the travel portal system and displayed in proximity to and associated with the item. For instance, in the example of FIG. 4, the user can select the icon 403 associated with the image 402, upon which a browser add-on can send the image 402 as an input to the travel portal system. In some examples, the user can select, e.g., right-click on, an item, upon which a pop-up menu is displayed in proximity to the item and provides an option for initiating a travel search. For instance, in the example of FIG. 5, the user can select, e.g., right-click on, the text string 502 and select the option to 'Initiate a Travel Search' from a pop-up menu 505, upon which a browser add-on can send the text string 502 as an input to the travel portal system.

In some implementations, the travel portal system receives geographic location information, e.g., travel origin location information, associated with the user. In some examples, the geographic location information associated with the user can be obtained from any of several sources, such as profile information associated with a social networking account or an internet protocol (IP) address associated with the client device.

Referring again to FIG. 2, in association with the item received by the travel portal system 202, the travel portal system can, in some examples, further receive information, e.g., geographic location information, associated with the item 204. In some examples, the information associated with the item can include explicit information, such as a latitude, a longitude, a country, a city, an airport, a plain text address, or any other direct indicator of a location. In some examples, the information associated with the item can include implicit information, such as recognizable features of a locatable object associated with the item or any indirect information from which explicit information may be determined. In some implementations, the information associated with the item can be obtained from metadata associated with the item, which can, in some instances, include geographic information, e.g., a geo tag.

If the travel portal system has received explicit information, e.g., explicit geographic location information, 206 associated with the item, then the travel portal system can provide a travel-related web page 208 over a network, e.g., the network 114 of FIG. 1, to the browser of the client device, e.g., a client device 102-110 of FIG. 1. If the travel portal system has not received explicit information 206 associated with the item, then the travel portal system can determine explicit information associated with the item based on implicit information, e.g., implicit geographic location information, associated with the item 212 and then provide a travel search interface 208, e.g., a travel portal web page 300, 400, 500.

In some implementations, for example, when the item is an image, the travel portal system can determine the explicit information by using image recognition software to determine an identity of an object displayed in the image, from which the explicit information can further be determined. For example, the image 302 shown in FIG. 3 is that of a well-recognized landmark, e.g., the Eiffel Tower. If the information received by the travel portal system in association with the image 302 does not include explicit geographic location information, then the travel portal system can execute image recognition software at the server to identify the object in the image based on image data stored in a repository, e.g., the data store 118 of FIG. 1. Using the identity of the object, other information stored in the repository, and a map application programming interface (API), the travel portal system can determine explicit information, e.g., explicit geographic location information, associated with the image 302.

In some implementations, for example, when the item is an image, the travel portal system can determine the explicit information by using search-by-image software instead of or in addition to image recognition software to map an image to a semantic interpretation of an object displayed in the image. For example, the image 402 shown in FIG. 4 is that of a seemingly unrecognizable lake from the perspective of the user. If the information received by the travel portal system in association with the image 402 does not include explicit geographic location information, then the travel portal system can execute search-by-image software using data stored in a repository, e.g., the data store 118 of FIG. 1, to associate explicit information, e.g., explicit geographic location information, with the image 402 using a map API.

In some implementations, for example, when the item is a text string, the travel portal system can determine the explicit information by using a character string search algorithm that identifies character strings, e.g., a name of a city, a country, or a well-recognized landmark, associated with a particular location. For example, the text string 502 shown in FIG. 5 includes a character string ‘S-e-i-n-e’ 505 referring to the Seine river in Paris, France. If the information received by the travel portal system in association with the text string 502 does not include explicit information, e.g., explicit geographic location information, then the travel portal system can execute the character string search algorithm at the server system 112 to identify the character string ‘S-e-i-n-e’ 505 in the text string 502 and associate the character string 505 with the city of Paris, France using data stored in a repository, e.g., the data store 118 of FIG. 1.

Referring again to FIG. 2, in some implementations, the travel portal system can use any of several tools to provide the travel-related web page 208. Example tools include a browser add-on, an embeddable widget, and a bookmarklet. Upon the travel portal system providing the travel-related web page 208, the travel portal system can pre-populate a destination field with a travel destination location 210 associated with the geographic location that is associated with the item.

FIG. 3 depicts an example travel portal web page 300 from which a travel search may be initiated. The travel portal web page 300 can be launched in a browser upon a user selecting, e.g., clicking on, the image 302 displayed on another web page 301. The travel portal web page 300 can include a departure location field 304, a departure date field 306, and a departure time field 308. In some implementations, the departure location field 304 can be prepopulated with information provided by the travel portal system and determined based on information, e.g., geographic location information, associated with the user. In some examples, the user can directly input a departure location in the departure location field 304. Example departure locations can include an airport, e.g., as indicated by the airport code AUS corresponding to Austin-Bergstrom International Airport in FIG. 3, a city, and a country. In some implementations, the user can further directly input a departure date and a departure time in the departure date field 306 and the departure time field 308, respectively.

The travel portal web page 300 further includes an arrival location field 310. In some implementations, the arrival location field 310 can be prepopulated with information provided by the travel portal system and determined based on location information associated with the image 302. Example arrival locations can include an airport, e.g., as indicated by the airport code CDG corresponding to Charles De Gaulle airport in FIG. 3, a city, and a country. In some implementations, a pull-down menu 312 can be accessed by selecting, e.g., clicking on, a menu indicator 314 displayed within proximity to the arrival location field 310. In some examples, the pull-down menu 312 can be prepopulated by the travel portal system and include one or more other arrival locations, e.g., as indicated by the airport codes MAD, MXP, and LHR in FIG. 3, based on location information associated with the item 302. The travel portal web page 300 can include a return location field 316, a return date field 318, and a return time field 320. In some implementations, the return location field 316 can automatically be prepopulated with the location indication provided in the departure location field 304. In some examples, the user can directly input any of the return location, a return date, and a return time in the return location field 316, the return date field 318, and the return time field 320, respectively.

In some implementations, the user can change one or more of the prepopulated departure location, prepopulated return location, and prepopulated arrival location by directly inputting a different location in the departure location field 304, the return location field 316, and the arrival location field 310, respectively. In some implementations, the user can change the arrival location by selecting an arrival location provided by the pull-down menu 312. In some implementations, the travel portal web page 300 can include search fields relating to other modes of travel, such as train or bus. Upon desired information being provided in the search fields 304-320, the user can select, e.g., click on, a submission icon 322 to submit the information to the travel planning system and thus continue planning the trip. In some examples, information relating to airline schedules, pricing, lodging, activities, and any other information associated with the travel plan to the selected arrival location 310 can be provided in another web page upon the user selecting the submission icon 322.

FIG. 4 depicts an example travel portal web page 400 from which a travel search may be initiated. The travel portal web page 400 can be launched in a browser upon a user selecting, e.g., clicking on, the icon 403 associated with the image 402 displayed on another web page 401. In the example of FIG. 4, the image 402 displays a boat floating on Lake Michigan, which location is initially unknown to the user of the web page 401. Similar to the travel portal web page 300, the travel portal web page 400 can include a departure location field 404, a departure date field 406, a departure time field 408, an arrival location field 410, a return location field 416, a return date field 418, a return time field 420, a pull-down menu 412, and a submission icon 422 that function in the same manner and that are subject to the same constraints as the search fields, pull-down menu, and submission icon displayed on the web page 300. In FIG. 4, example arrival locations include several airports within proximity to Lake Michigan, e.g., as indicated by the airport codes TVC, GRR, GRB, and MKE.

FIG. 5 depicts an example travel portal web page 500 from which a travel search may be initiated. The travel portal web page 500 can be launched in a browser upon a user selecting, e.g., right-clicking on, the text string 502 displayed on another web page 501 and subsequently selecting the ‘Initiate a Travel Search’ option within the pop-up menu 505. In the example of FIG. 5, the text string 502 describes attractions located in Paris, France. Similar to the travel portal web pages 300 and 400, the travel portal web page 500 can include a departure location field 504, a departure date field 506, a departure time field 508, an arrival location field 510, a return location field 516, a return date field 518, a return time field 520, a pull-down menu 512, and a submission icon 522 that function in the same manner and that are subject to the same constraints as the search fields, pull-down menus, and submission icons displayed on the web pages 300 and 400. In FIG. 5, example arrival locations include several airports within proximity to Paris, France, e.g., as indicated by the airport codes CDG, MAD, MXP, and LHR.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification includes many specific implementation details, these should not be construed as limitations on the scope of the disclosure or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:

one or more computers and one or more storage devices storing instructions that are operable, when executed by the one or more computers, to cause the one or more computers to perform operations comprising:

receiving an input that identifies an image displayed on a web page that is independent of a travel services website, the image comprising one or more recognizable features of a locatable object displayed in the image;

based on receipt of the input, initiating a travel search interface displayed separately from the web page;

determining explicit information by performing an image recognition process or a search-by-image process on the image to identify the one or more recognizable features, the explicit information comprising the geographic location;

receiving information associated with a user;

displaying a plurality of search fields comprising a travel origin field, a travel destination field, and a travel departure date field in the travel search interface;

pre-populating the travel destination field with a code corresponding to a travel destination location associated with the geographic location; and pre-populating the travel origin field based on the information associated with the user.

2. The system of claim 1, wherein the input comprises a geo tag.

3. The system of claim 1, wherein the explicit information comprises one or more of a latitude, a longitude, a country, a city, an airport, an address, or a direct indicator of the geographic location.

4. The system of claim 1, wherein the information associated with the user is received from one or more sources comprising a social networking account, an IP address, or the user.

5. The system of claim 1, wherein the travel destination location comprises one or more of a name of a city, a name of a country, or an airport code.

6. The system of claim 1, wherein the operations further comprise pre-populating the travel origin field with an airport code based on information received from one or more sources comprising a social networking account, an IP address, or the user.

7. The system of claim 6, wherein the operations further comprise pre-populating the departure date field with a departure date.

8. The system of claim 1, wherein the input further identifies a text string displayed on the web page.

9. The system of claim 8, wherein the input comprises an indirect indicator of the geographic location that is associated with the text string.

10. The system of claim 9, wherein the operations further comprise determining the explicit information based on the text string using a character string search algorithm.

11. A computer storage medium encoded with a computer program, the computer program comprising instructions that when executed by one or more computers cause the one or more computers to perform operations comprising:

receiving an input that identifies an image displayed on a web page that is independent of a travel services website, the image comprising one or more recognizable features of a locatable object displayed in the image;

based on receipt of the input, initiating a travel search interface displayed separately from the web page;

determining explicit information by performing an image recognition process or a search-by-image process on the image to identify the one or more recognizable features, the explicit information comprising the geographic location;

receiving information associated with a user;

displaying a plurality of search fields comprising a travel origin field, a travel destination field, and a travel departure date field in the travel search interface;

pre-populating the travel destination field with a code corresponding to a travel destination location associated with the geographic location; and pre-populating the travel origin field based on the information associated with the user.

12. The computer storage medium of claim 11, wherein the input comprises a geo tag.

13. The computer storage medium of claim 11, wherein the explicit information comprises one or more of a latitude, a longitude, a country, a city, an airport, an address, or a direct indicator of the geographic location.

14. The computer storage medium of claim 11, wherein the travel destination location comprises one or more of a name of a city, a name of a country, or an airport code.

15. A computer-implemented method for initiating a travel search, the computer-implemented method comprising:

receiving an input that identifies an image displayed on a web page that is independent of a travel services website, the image comprising one or more recognizable features of a locatable object displayed in the image;

based on receipt of the input, initiating a travel search interface displayed separately from the web page;

determining explicit information by performing an image recognition process or a search-by-image process on the image to identify the one or more recognizable features, the explicit information comprising the geographic location;

receiving information associated with a user;

displaying a plurality of search fields comprising a travel origin field, a travel destination field, and a travel departure date field in the travel search interface;

pre-populating the travel destination field with a code corresponding to a travel destination location associated with the geographic location; and pre-populating the travel origin field based on the information associated with the user.

16. The computer-implemented method of claim 15, wherein the information associated with the user is received from one or more sources comprising a social networking account, an IP address, or the user.

17. The computer-implemented method of claim 15, wherein the travel destination location comprises one or more of a name of a city, a name of an airport, or an airport code.

* * * * *